Nov. 5, 1968

C. ARNE 3,409,161

DIKE TANK

Filed April 10, 1967

INVENTOR.
Christian Arne
BY
Merriam, Marshall, Shapiro & Klose
ATTORNEYS

Nov. 5, 1968
C. ARNE
3,409,161
DIKE TANK
Filed April 10, 1967
2 Sheets-Sheet 2
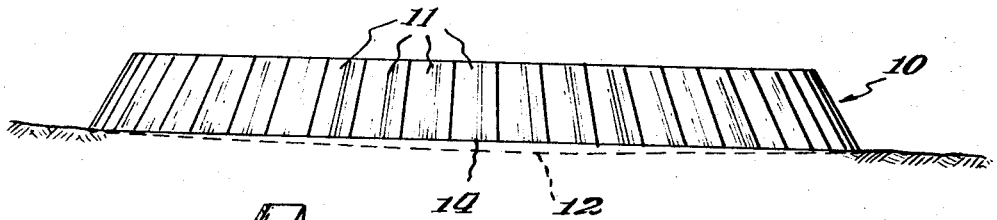
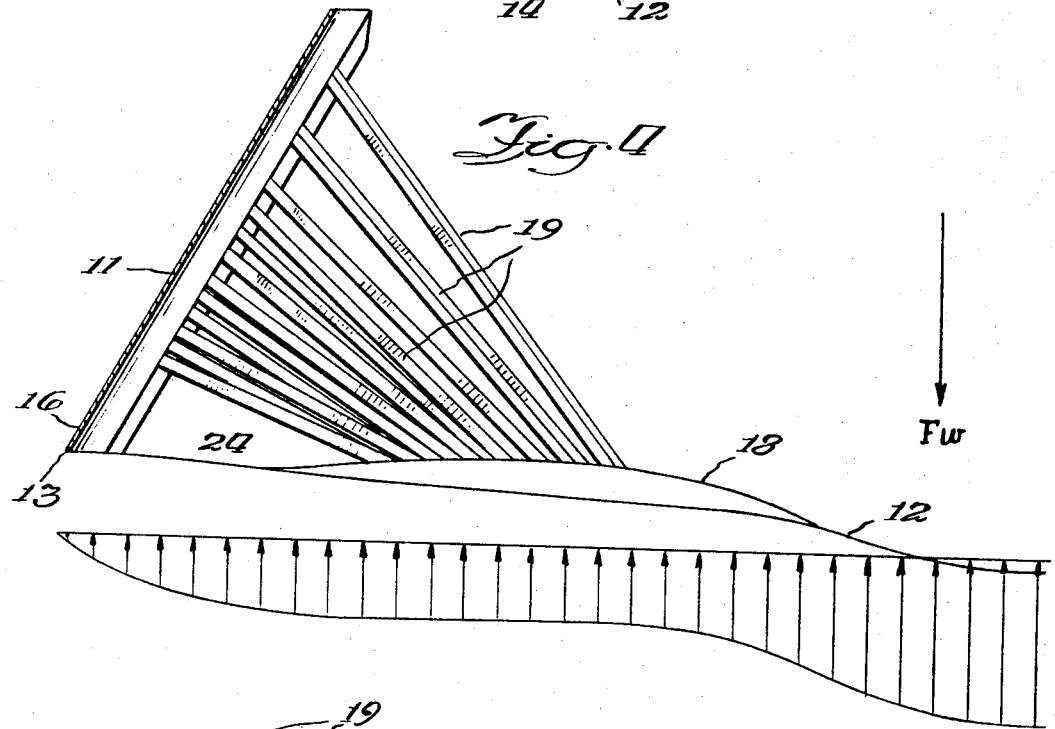
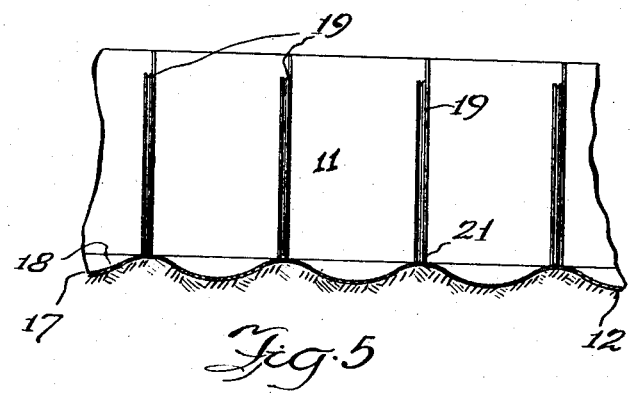
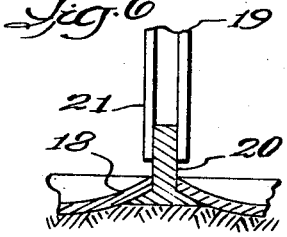
INVENTOR.
Christian Arne
BY
Merriam, Marshall, Shapiro & Klose
attorneys 3,409,161
DIKE TANK
Christian Arne, Chicago, Ill., assignor to Chicago Bridge & Iron Company, Oak Brook, Ill., a corporation of Illinois
Filed Apr. 10, 1967, Ser. No. 629,642
7 Claims. (Cl. 220—1)

ABSTRACT OF THE DISCLOSURE

A storage tank capable of storing large quantities of liquid having a sidewall consisting of a plurality of curved elongated elements which are tilted inwardly towards the center of the tank and are secured to the tank bottom by means of a series of tie-down members.

Background of the invention

This invention relates to storage tanks and particularly to those tanks capable of holding large quantities of liquid.

Storage tanks of various sizes and shapes have been in common usage for some time. The most common storage tank has a flat bottom and a cylindrically shaped sidewall. Cylindrical flat bottomed storage tanks have a capacity not normally exceeding 250,000 barrels. Once it is desired to store a substantially greater amount of liquid, necessarily by increasing the diameter of the tank and/or the height of the sidewalls, it becomes essential to reinforce the sidewalls to accommodate the greatly increased horizontal component of the liquid pressure developed. Bolstering the walls of the tank to the extent necessary, however, places such an enormous amount of weight at the periphery of the tank that shearing of the ground at or adjacent the periphery may be expected. It is consequently further necessary to provide for the stabilization of the ground surface beneath and adjacent to the tank bottom. The cost of the material and effort required to reinforce the sidewalls and to prepare the ground surface to build such a structure is so prohibitive that it is economically more efficient to erect a plurality of tanks. There are, however, numerous and obvious disadvantages in using a plurality of tanks such as the increase in land area and maintenance required.

With the present invention, one large tank can be erected economically which tank can store huge quantities of liquid. The tank is structurally sound and will provide for substantial savings in ground area needed and expenses incurred in the preparations of the ground area and building material required.

Summary of the invention

It is herein proposed that large capacity storage tanks be built consisting of a plurality of curved sidewall elements (hereinafter corrugations) arranged in a circular pattern to define an enclosed storage area. Each corrugation is tilted inwardly towards the center of the tank. The bottom of the tank is saucer shaped and has a hold-down area an annular raised ridge located near the periphery of the tank.

A plurality of tie-down members extend from each corrugation and are secured to the hold-down area. Each corrugation is secured at its bottom to the periphery of the tank bottom.

When liquid is stored in a tank, there exists a horizontal force acting on the sidewall and a vertical force acting on the tank bottom. Because of the novel arrangement and shape of the corrugations in the present invention, the resulting forces are dissipated or transmitted in such a way as to allow for the erection of a storage tank capable of storing enormous quantities of liquid while employing a minimum of building material and site preparation.

Because the horizontal force on any given point on a sidewall is proportional to the diameter of the tank and consequently to curvature of the sidewalls, that force can be substantially reduced by providing a plurality of corrugations to define the sidewall of the tank. The radius of curvature of each corrugation is shorter than the radius of curvature of a monolithic cylindrical sidewall and consequently, given an identical amount of stored liquid, the force acting on any given point on a corrugated sidewall is substantially less than on any given point on a cylindrical sidewall.

In the present invention, this horizontal liquid pressure is balanced by an equal and opposite horizontal force, i.e., the tension in the bottom plates of the tank bottom. These two forces create an overturning moment which, unless counterbalanced, would push the corrugations outward.

Because the corrugations are tilted inwardly, the horizontal liquid pressure also creates an uplifting force at any given point on each corrugation. This uplifting force is balanced by that portion of the weight of the liquid exerted on the tank bottom which is transmitted through the tie-down members. The moment created by the uplift and the weight of the fluid acts as a righting moment to counterbalance the overturning moment.

One of the advantages derived by the tilting of the corrugations is that it serves to "pick up" some of the weight of the liquid stored and thereby decrease the weight acting on the ground surface beneath the tank so that ground surfaces of varying characteristics are suitable as foundations without costly preparation.

In a cylindrical tank, the weight at the periphery is dependent on the height and weight of the fluid and the weight of the structural material employed in the sidewall. In the present invention, the weight at the junction of each corrugation and the tank bottom is, for all practical purposes, zero. By varying the inward slope of the corrugations, the weight of the fluid adjacent to the periphery of the tank bottom can be gradually reduced at a rate designed to suit the type of ground surface encountered. With the gradual decreasing of the load toward the periphery of the tank, the chances for shearing the ground surface and damaging the tank structure are essentially eliminated.

The advantages of the present invention over the commonly used cylindrical tank can be seen from the following example wherein it is desired to store a quantity of water. Water in a tank having a flat bottom and a cylindrical shell 48' high will exert a force of 3,000 lbs./square foot on the tank bottom. At the periphery of the tank, the load will abruptly shift from 3,000 lbs./sq. ft. to 0 lb./sq. ft. and will therefore not only create a situation where shearing at the periphery must be considered but will tend to force the soil under the tank to the outside causing the center of the tank to sink and possibly rupture. Where such large volume cylindrical tanks have been built, it has been the practice to build a pile foundation with a concrete slab and often reduce the height of the sidewalls.

The same type soil would be able to support 4,000 lbs./sq. ft. at the center of the tank if the load was gradually decreased at the edge of the tank. With the present invention, employing the proper slope or tilt to the corrugations, the force exerted by the weight of the liquid would be reduced to 2,000 lbs./sq. ft. at the hold-down area.

A force of 4,000 lbs./sq. ft. is exerted by water at a height of 64'. Consequently, by utilizing the teachings of the subject invention, larger volume tanks can be erected without building a special foundation.

Using the tank of the subject invention for the storage of between one million and two million barrels of water, the tank, including cone roof, would weigh approximately 5 lbs./barrel. Disregarding soil stabilization problems, a cylindrical tank of the same capacity and having a cone roof would weigh approximately 7 lbs./barrel.

It is also an important element of the subject invention that the tank bottom be saucer shaped, i.e., deeper at the center than at the periphery. Utilization of this type of tank bottom will decrease the weight by another 1 lb./barrel.

*Brief description of the drawings*

The present invention will be more fully understood with reference to the following drawings wherein:

FIGURE 3 is an elevation of the subject invention;

FIGURE 4 is a partial cross-sectional view of a corrugation and the tank bottom with force lines superimposed thereon;

FIGURE 5 is a partial elevation view of the sidewall as viewed from the center of the tank; and FIGURE 6 is a fragmentary view of the tie-down member as attached to the tank bottom.

*Description of the preferred embodiment*

Figure 1:
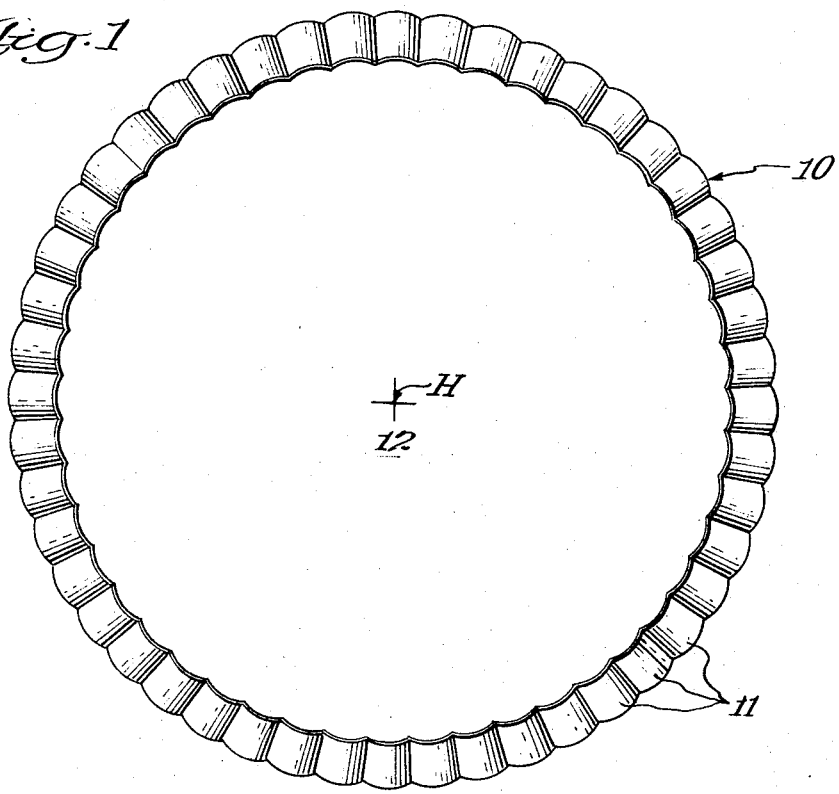
FIGURE 1 is a plan view of a storage tank made in accordance with the subject invention.

Referring first to FIGURES 1 and 3, storage tank 10 is shown having a plurality of corrugations 11 upwardly and inwardly extending from the periphery or edge 13 of tank bottom 12. Tank bottom 12 slopes downwardly from edge 13 of tank 10 to the center 14 of tank 10.

The details of the novel structural elements and the relevant forces acting upon those structural elements are most clearly shown in the remaining figures wherein common reference numerals will be used for all figures.

Each corrugation 11 is an elongated sidewall member having an arcuate cross section. The bottom edge 16 of each corrugation 11 is secured to edge 13 of tank bottom 12. Each corrugation 11 slopes inwardly toward center 14 of tank 10.

Tank bottom 12 is formed to the general configuration of a saucer or an inverted cone with the apex at center 14 of tank 10.

Spaced from edge 13 of tank bottom 12 is a hold-down area 17 shown here as an undulating annular ridge having high points or plateaus 18 to which are secured tie-down members 19. Tie-down members 19 extend from each corrugation 11 to a plateau 18. Each plateau 18 includes an elongated beam 20 or the like to which the lower end 21 of each tie-down member 19 may be secured. This form of hold-down area is designed to facilitate the drainage of liquid from the space 24 between the corrugation 11 and hold-down area 17 to center 14 of tank 10. It is understood that the hold-down area may be substantially and uniformly raised throughout if means are included to facilitate drainage from space 24.

Figure 2:
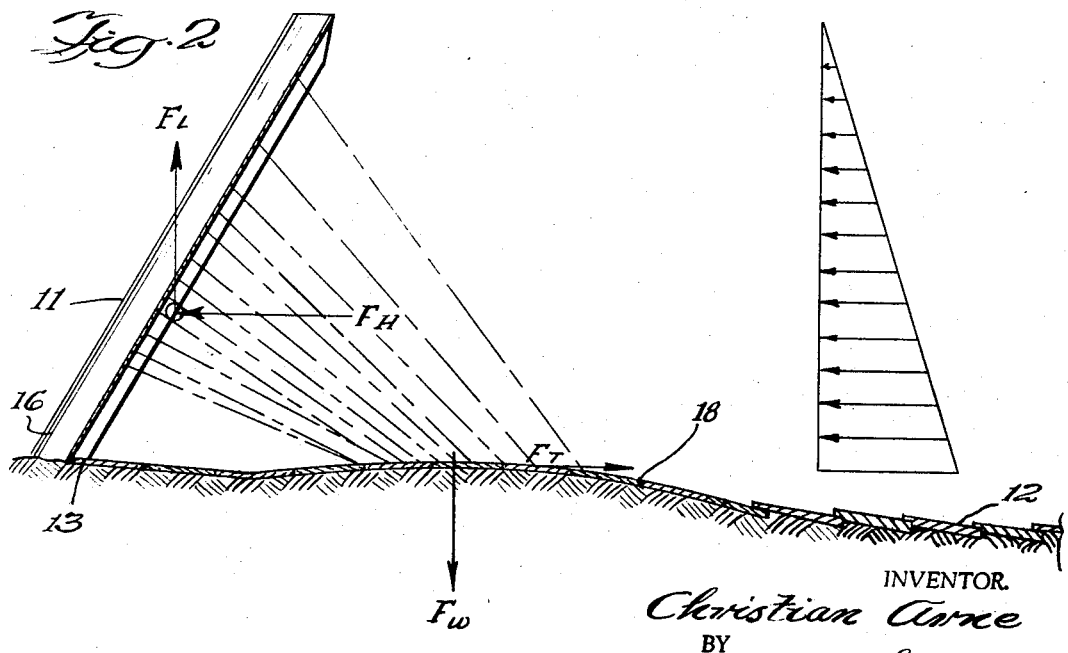
FIGURE 2 is a partial cross-sectional view of a corrugation and the tank bottom with force lines superimposed thereon.

Reference is now made to the force lines shown in FIGURE 2. The length of each force line is in proportion to the force exerted by the liquid stored on any given point on the corrugations 11, the force increasing with depth. In conventional tank construction, the sidewalls are similarly wedge shaped to resist these forces, i.e., the sidewall is made increasingly thicker from top to bottom. In FIGURE 2 the component of this horizontal force acting on the corrugations 11 is shown as $F_H$. Because bottom 16 of the corrugation 11 is secured to tank botton 12 at edge 13, this force creates a tension $F_T$ in tank bottom 12.

With the corrugations 11 sloped inwardly, there exists a force $F_L$ which tends to lift each corrugation 11. This force $F_L$ is resisted somewhat by the weight of the stored material $F_W$ which acts upon tank bottom 12 and is transmitted to corrugations 11 through tie-down members 19.

The combination of $F_H$ and $F_T$ creates a moment acting counterclockwise at the tank edge 13 and which, unless balanced by another moment, would tend to topple over corrugations 11. The balancing moment is supplied by the combination of $F_W$ and $F_L$ acting clockwise about tank edge 13.

Referring now to FIGURE 4, the force lines illustrate the load on tank bottom 12. At center 14 of the tank 10 and throughout the major portion of the tank bottom 12, e.g. from center 14 approximately to hold-down area 17, the weight of the liquid $F_W$ is substantially uniform. When the bottom 12 slopes downwardly towards center 14 and because $F_W$ is in porportion to the height of the liquid, $F_W$ will increase towards the tank center 14.

Because $F_L$ acting on each corrugation is transmitted to hold-down area 17 through tie-down members 19, the weight of the liquid to be supported by the tank bottom 12 and foundation at hold-down area 17 is greatly reduced. This decreased vertical force is illustrated by the shortening of the force lines at hold-down 17.

Between hold-down area 17 and edge 13, the weight of the liquid, $F_W$, gradually decreases at a rate controlled by the slope of corrugations 11, again because $F_W$ is proportional to the height of the liquid. The height of the liquid decreases toward the tank edge until it is essentially zero and consequently $F_W$ approaches zero.

The preferred embodiment of the present invention will be shown through the following example wherein it is desired to construct a 500′ diameter tank for the storage of water.

The sidewall of the tank will be comprised of 48 individual elongated members or corrugations. Each corrugation is fabricated from A283 Steel and is of arcuate cross section having an arc length of approximately 32′ 8¾″. Each corrugation is inclined 30° to the horizon and may be constructed of a plurality of shell plates. In the present embodiment, the overall length is 55′ 5″. The thickness of the shell plates increases from .3125″ at the top of each corrugation to approximately .50″ at the bottom. The corrugations thereby produce a sidewall height of 48′ 0″.

The bottom of the tank adjacent to the tank edge is constructed of .375″ thick butt welded plates and is approximately 26′ wide. This portion of the tank bottom is connected to the hold-down area which is an annular ridge 32′ wide and having 48 spaced ridge beams secured thereto.

Channel beams are used as tie-down members and are secured at one end to brackets or the like on the corrugations and at the other end to the ridge beam. The brackets or other fastening means are preferably aligned vertically on each corrugation with the tie-down member at the uppermost bracket extending to the securing point on the ridge mean closest the tank center. Each subsequent tie-down member is secured to the next lowest bracket and the next closest point on the ridge beam. Twelve tie-down members are employed. In order to more adequately carry wind loads encountered, it is preferred that one or more of the tie-down members be composed of two channel beams secured together so that the upper beam has its open side up with one short side of the lower beam secured to the bottom of the upper beam. The remainder of the tank bottom is comprised of lap-welded bottom plates .25″ thick.

This tank has a capacity of 1,666,000 barrels of water and employs only 3.6 lbs. of steel per barrel. When the tank is filled to capacity, $F_H$=2,260,000 lbs.

$$F_L = 1,380,000 \text{ lbs.}, F_W = 2,600,000 \text{ lbs.}$$

and $$F_T = 2,260,000 \text{ lbs.}$$

As can be seen with the arrangeemnt of the tie-down members and with a hold-down area of such size, a considerable portion of the $F_W$ is "picked up." The remaining component of the water load or the hold-down water load serves to press the bottom of the tank in contact with the underlying soil. It is preferred that the hold-down water load be approximately one-half $F_W$ when the tank is full to allow a margin of safety against momentary loads like wind suction on the sidewall, earthquakes or wave action in the tank.

The horizontal force acting on each corrugation is dependent on the radius of curvature of the corrugation and, consequently, the thickness of the plates employed in constructing the corrugation will have to be increased if the radius is increased. The design of these elements can, therefore, be undertaken with consideration given to the thickness which can be most economically purchased, fabricated and welded.

The preceding discussion was made for purposes of illustration only, it being understood that others will make obvious changes while remaining within the scope and spirit of the invention.

What is claimed is:

1. A tank for the storage of liquid comprising:
   a tank bottom having an edge, a hold-down area spaced from said edge and a center;
   a sidewall having a top edge and a bottom edge, said bottom edge secured to the edge of said tank bottom and said sidewall tilted inwardly from the bottom edge to said top edge toward said center so that the height of the liquid at the edge is substantially zero; and
   a plurality of tie-down members extending from the sidewall to said hold-down area.

2. A storage tank comprising:
   a tank bottom having a substantially circular edge, an annular hold-down area spaced from said edge and a center;
   a sidewall composed of a plurality of abutting elongated corrugations arranged in a circular pattern, each of said corrugations having a top edge, a bottom edge and an arcuate cross-section, said bottom edge of each corrugation secured to the edge of the tank bottom and each corrugation tilted inwardly from the bottom edge to said top edge toward said center;
   a plurality of tie-down members extending from each of the corrugations to said hold-down area, each tie-down member having a first end and a second end;
   means for securing said first end of said tie-down members to the corrugations; and
   means for securing said second end of said tie-down members to said hold-down area.

3. A storage tank as described in claim 2 wherein said tank bottom slopes downwardly from the edge to said center.

4. A storage tank as described in claim 2 wherein said hold-down area is an undulating, annular ridge having plateaus and said means for securing said second end of said tie-down members to said hold-down area includes an elongated, radially disposed beam secured to each of said plateaus.

5. A storage tank as described in claim 2 wherein said tank bottom is comprised of a plurality of butt-welded bottom plates located between said hold-down area and said edge, and a plurality of lap-welded bottom plates located between said hold-down area and said tank bottom.

6. A storage tank as described in claim 2 wherein the radius of curvature of each corrugation is substantially less than the radius of the tank.

7. A storage tank as described in claim 2 wherein said corrugations are tilted inwardly at least 30°.

References Cited

UNITED STATES PATENTS

| | | | |
|---|---|---|---|
| 1,284,445 | 11/1918 | Post | 220—5 |
| 2,095,256 | 10/1937 | Horton. | |
| 2,532,854 | 12/1950 | Plummer. | |

FOREIGN PATENTS

| | | |
|---|---|---|
| 898,297 | 6/1962 | Great Britain. |
| 699,550 | 12/1964 | Canada. |

RAPHAEL H. SCHWARTZ, *Primary Examiner.*